United States Patent Office 3,312,739
Patented Apr. 4, 1967

3,312,739
N-(SUBSTITUTED AMINO ALKYL)-2-ALKOXY-SULFAMOYL BENZAMIDES
Michael Leon Thominet, Paris, France, assignor to Societe d'Etudes Scientifiques et Industrielles de l'Ile-de-France, Longjumeau, Seine-et-Oise, France, a corporation of France
No Drawing. Filed Sept. 14, 1965, Ser. No. 487,327
Claims priority, application France, July 25, 1961, 869,010, 869,011
4 Claims. (Cl. 260—556)

This application is a continuation-in-part application of the co-pending applications of M. L. Thominet, S.N. 210,554, filed July 17, 1962, now U.S. Patent No. 3,177,-252 and S.N. 432,407, filed Feb. 12, 1965, now abandoned.

This invention relates to substituted benzamides having the formula:

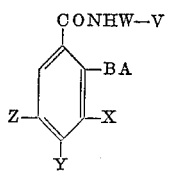

in which V is a group having either of the following formulas:

or

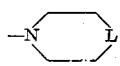

in which $R_1$ and $R_2$ are lower alkyl such as the methyl, ethyl, propyl or isopropyl; L is nitrogen, oxygen, methylene or a group having the formula: NR in which R is hydrogen or a lower alkyl, such as a methyl or isopropyl; W is alkylene of 1 to 4 carbon atoms such as the ethylene, propylene, methyl ethylene or 2-methyl propylene; A is a lower alkyl such as the methyl, isopropyl, or isobutyl; B is sulfur or oxygen; and X, Y and Z are hydrogen, sulfamoyl, lower alkylsulfamoyl, such as methylsulfamoyl or butylsulfamoyl, di lower alkylsulfamoyl, such as the dipropylsulfamoyl. One of the substituents, X, Y, or Z is a sulfamoyl, lower alkylsulfamoyl or di lower alkylsulfamoyl. The other two remaining of X, Y and Z are hydrogen.

The substituted benzamides of the present invention are prepared from substituted 2-alkoxy benzoic acids or substituted 2-alkylthio benzoic acids as follows:

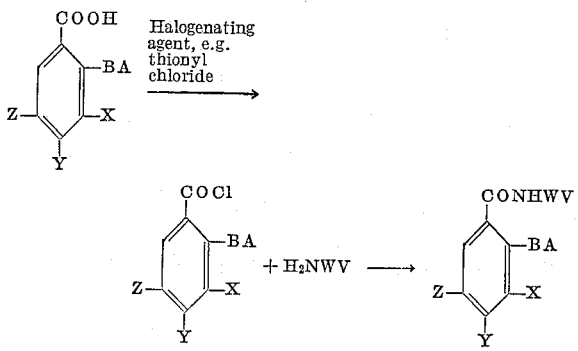

in which W, V, B, A, X, Y and Z have the same meanings as heretofore specified.

In the first stage, the substituted 2-alkoxy benzoic acid or substituted 2-alkylthio benzoic acid is converted to the corresponding acid chloride by treatment with an appropriate halogenating agent, such as thionyl chloride. In the second stage, the resulting substituted benzoyl halide obtained, such as the substituted benzoyl chloride, is reacted in an inert solvent with the disubstituted diamine so that the hydrohalide, such as the hydrochloride of the basic benzamide obtained may be recoverable in a relatively pure state by filtration or centrifugation. The disubstituted diamine used as a reactant has the formula:

$H_2NWV$

Under these conditions, the hydrochloric acid formed, for example, in the course of the reaction neutralizes the tertiary amino function of the benzamide formed. Examples of inert solvents in which the reaction occurs are: acetone, methyl ethyl ketone, benzene, toluene and ether. The reaction is conducted at low temperature, a temperature between 0 and 5° C. giving good results.

The acid salts of the substituted 2-alkoxy benzamides and the substituted 2-alkylthio benzamides are produced by causing the benzamide base to react with an acid such as hydrochloric acid, hydrobromic acid, hydroiodic acid, phosphoric acid, sulfuric acid, citric acid, tartaric acid and lactic acid. Ethane sulfonic acid or acids, such as diphenylacetic acid, which salts are substantially insoluble in water permit a slow absorption of the composition when administered, thereby effecting prolonged action of the compositions.

The quarternary ammonium salts are obtained by reacting the substituted benzamide base with an aliphatic or aromatic agent such as methyl chloride, methyl bromide, methyl iodide, dimethyl sulfate, methyl benzene sulfonate, methyl p-toluene sulfonate, ethyl bromide, propyl bromide and benzyl chloride.

The substituted benzamides of this invention possess significant pharmacological properties and may be used for the treatment of emesis associated with many conditions, such as pregnancy and seasickness, and behavior disturbances. For this purpose, the substituted benzamides or their salts may be incorporated in or combined with pharmaceutically acceptable carriers.

A more comprehensive understanding of this invention is obtained by reference to the following examples.

*Example I.—N-(2-diethylaminoethyl)-2-methoxy-5-dimethylsulfamoylbenzamide*

69 grams (0.27 mole) of 2-methoxy-5-dimethylsulfamoylbenzoic acid are heated for 2½ hours with 64 g. (0.54 mole) of thionyl chloride. The solution obtained is added while it is still warm to 250 cc. of petroleum ether. The 2-methoxy-5-dimethylsulfamoylbenzoyl chloride is precipitated, centrifuged, washed with petroleum ether, and dried under vacuum. 72 grams of product are obtained, representing a yield of 97%.

The 72 g. of 2-methoxy-5-dimethyl-sulfamoylbenzoyl chloride are dissolved in 100 cc. of methyl ethyl ketone and introduced drop by drop in 30 g. (0.26 mole) of N,N-diethylethylene diamine previously dissolved in 200 cc. of methyl ethyl ketone, the temperature being maintained between 0 and 5° C. during the reaction.

The N-(2-diethylaminoethyl)-2 - methoxy - 5 - dimethyl sulfamoylbenzamide hydrochloride which is precipitated, centrifuged and washed on the filter with methyl ethyl ketone. The yield is 86% of a product having a melting point of 133–134° C.

The corresponding N-(2-diethylaminoethyl)-2-methoxy-5-methylsulfamoylbenzamide hydrochloride is prepared in the same manner as described in this example except that 2-methoxy-5-methylsulfamoylbenzoic acid is used as the starting material instead of 2-methoxy-5-dimethylsulfamoylbenzoic acid.

*Example II.—N-(2-diethylaminoethyl)-2-methoxy-5-sulfamoylbenzamide*

This compound is prepared in the same manner as in Example I. Starting with 66 g. (0.3 mole) of 2-methoxy-5-sulfamoylbenzoic acid, 55 g. (80% yield) of N-(2-diethylaminoethyl)-2-methoxy-5-sulfamoylbenzamide are obtained, having a melting point of 183–185° C.

*Example III.—N-(ethylpropylaminoethyl)-2-methoxy-5-sulfamoylbenzamide*

In a 2 liter flask, provided with a refrigerant for reflux, there are placed 80 g. of thionyl chloride and 78 g. (0.33 mole) of 2-methoxy-5-sulfamoylbenzoic acid. The reaction mixture is heated on a water bath to dissolution. When all the acid is dissolved, the acid chloride crystallizes. The mixture is poured into 200 ml. of petroleum ether. It is allowed to cool, is dried, washed in petroleum ether and dried under vacuum. There is obtained 85 g. of 2-methoxy-5-sulfamoylbenzoyl chloride, representing a yield of 97%.

In a 2 liter flask equipped with an agitator, a thermometer and an ampoule of bromine, there are dissolved 52 g. of N-ethyl-N-propylethylenediamine in 200 ml. of methylethylketone. It is cooled to 0° C. and there is added drop by drop the 2-methoxy-5-sulfamoylbenzoyl chloride dissolved in 150 ml. of methylethylketone. Throughout this procedure, the temperature is maintained between 0° and 5° C. After the addition of the acid chloride, the mixture is agitated for one hour and the hydrochloride of N-(ethylpropylaminoethyl)-2-methoxy-5-sulfamoylbenzamide crystallizes. It is dried, washed successively twice with 30 ml. of methylethylketone and once with a small quantity of alcohol. The hydrochloride has a melting point of 165–166° C. and is obtained in a yield of 78% of the theoretical.

The hydrochloride of other N-substituted-2-methoxy-sulfamoylbenzamides are produced by following the same procedure as described in Example III by utilizing the appropriate N-substituted-2-methoxy-sulfamoylbenzoic acid and amine. For example, the hydrochlorides of the following N-substituted-2-methoxy-sulfamoylbenzamides are produced by following the procedure of Example III and have a melting point indicated in the following table:

| Hydrochloride of: | Melting point, ° C. |
|---|---|
| N - (2 - diethylaminopropyl)-2-methoxy-5-sulfamoylbenzamide | 129–130 |
| N - [ethyl - (1-methyl-butyl)-aminoethyl]-2-methoxy-5-sulfamoylbenzamide | 153–154 |
| N - (1 - ethyl - 2 - piperidyl-methyl)-2-methoxy-5-sulfamoylbenzamide | 171 |
| N - (methyl-propylaminoethyl)-2-methoxy-5-sulfamoylbenzamide | 168–169 |
| N - (ethyl - cyclopentylaminoethyl) - 2-methoxy-5-sulfamoylbenzamide | 180–181 |

What is claimed is:

1. A compound selected from the group consisting of free bases and non-toxic salts thereof, said free bases having the formula:

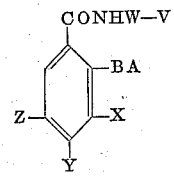

in which V is a member selected from the class consisting of radicals having the formulas:

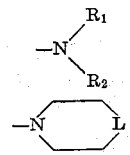

in which $R_1$ and $R_2$ are lower alkyl; L is a member selected from the class consisting of nitrogen, oxygen, methylene and the radicals having the formula: NR in which R is selected from the class consisting of hydrogen, lower alkyl and lower alkyl sulfamoyl; W is lower alkylene of 1 to 4 carbon atoms; A is lower alkyl; B is selected from the class consisting of sulfur and oxygen; and X, Y and Z are selected from the class consisting of hydrogen, sulfamoyl, lower alkyl sulfamoyl and di lower alkyl sulfamoyl; only one of said groups X, Y and Z being selected from the class consisting of sulfamoyl, lower alkylsulfamoyl and di lower alkylsulfamoyl and the remaining two being hydrogen.

2. N - (2-diethylaminoethyl)-2-methoxy-5-dimethylsulfamoylbenzamide.

3. N - (2 - ethylaminoethyl) - 2 - methoxy-5-sulfamoylbenzamide.

4. N - (2 - diethylaminoethyl) - 2-methoxy-5-methylsulfamoylbenzamide.

References Cited by the Examiner

UNITED STATES PATENTS

| 2,691,025 | 10/1954 | Clinton et al. | 260—294 A |
| 2,910,488 | 10/1959 | Novello | 260—556 B |
| 3,177,252 | 4/1965 | Thominet | 260—556 AX |

FOREIGN PATENTS 797,476  7/1958  Great Britain.

OTHER REFERENCES

B.S.M. 36 CAM, July 1963, patent of Addition to French BSM 1,525.

WALTER A. MODANCE, *Primary Examiner.*

A. D. SPEVACK, *Assistant Examiner.*